Nov. 2, 1937. C. G. WILKINSON 2,098,121
BEARING
Filed Dec. 5, 1934
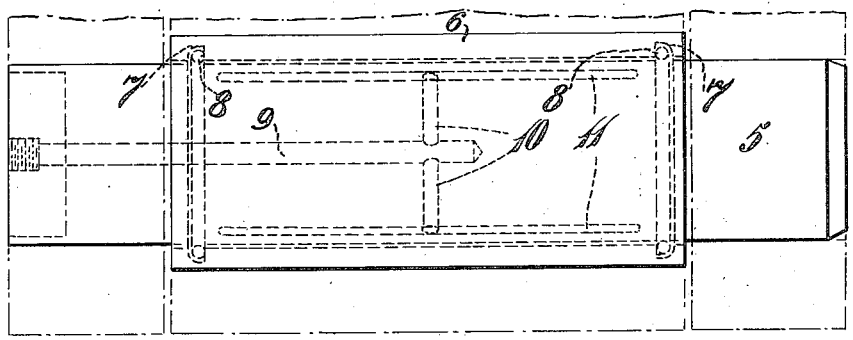
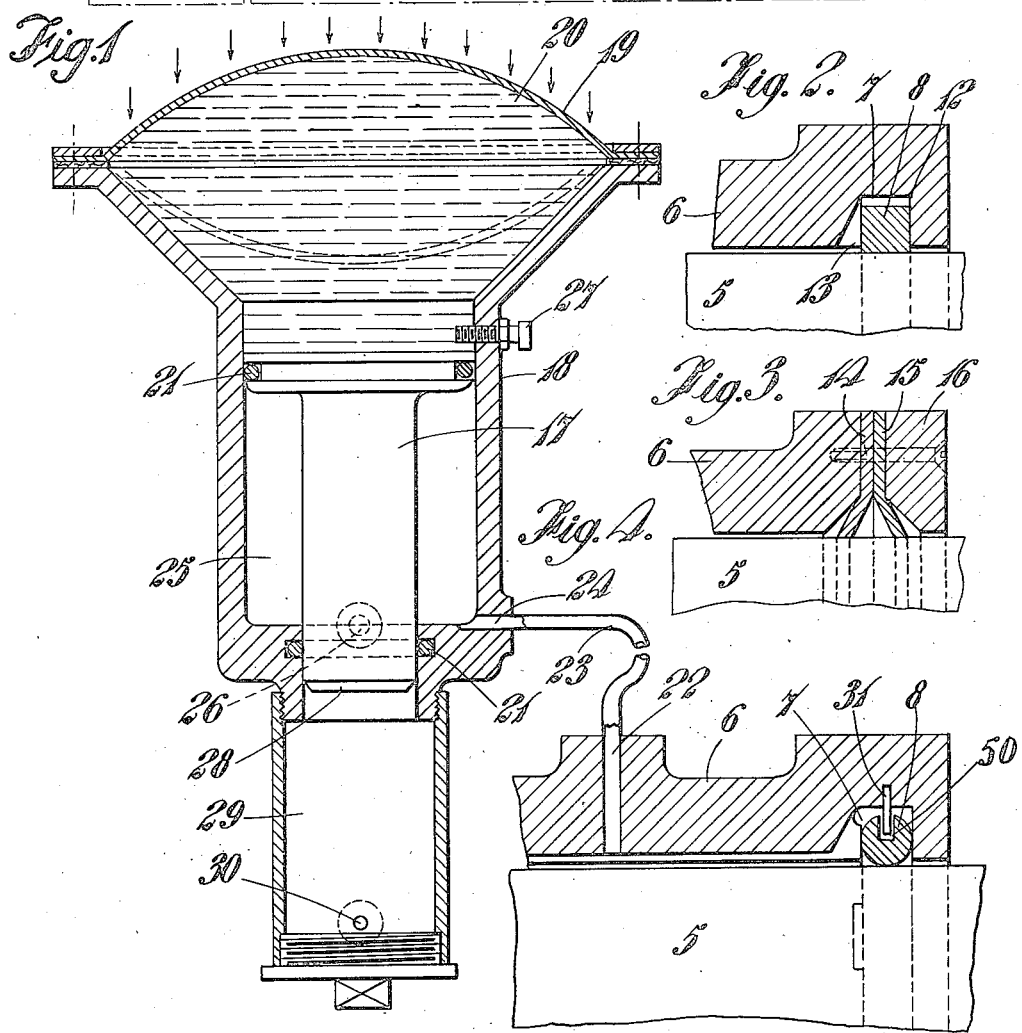
INVENTOR
C. G. Wilkinson.
By Lacey & Lacey
Attys Patented Nov. 2, 1937

2,098,121

UNITED STATES PATENT OFFICE 2,098,121

BEARING

Cuthbert George Wilkinson, Kuala Sawah, Federated Malay State of Negri Sembilan

Application December 5, 1934, Serial No. 756,155
In Great Britain December 5, 1933

1 Claim. (Cl. 308—36.3)

This invention relates to bearings and has particular application to the bottom tumbler, ladder roller and bucket-eye under-water bearings of dredgers.

An object of the invention is to prevent the entry of grit or other foreign matter into the bearing as the pressure of water increases according to the depth to which the bearing is immersed.

According to the present invention, a bearing for the purpose specified is sealed by means of a flexible ring or membrane. Generally, the bearing is for carrying a shaft member, in which case the sealing ring or membrane will be arranged within a groove near each end of the bearing which may then be packed up with grease in the usual manner. To prevent the entry of foreign matter, the ring or membrane may be of a compressible nature so as to be deformed in such a manner as to bear tightly against a surface of the groove and securely seal the bearing on increase of pressure, which may be internal or external of the sealing ring. The engagement of the inner periphery of the sealing ring with the shaft is such that the joint between these two members shall be as nearly as possible watertight. The invention contemplates the building up of pressure within the bearing to deform the sealing ring, and by maintaining the internal pressure greater than that likely to be encountered in the working conditions, to maintain the sealing ring in the deformed condition in which it seals the bearing. In a general embodiment of the invention means may be provided for increasing the internal pressure within the bearing to compensate for a rise of external pressure.

In order that it may be clearly understood and more readily carried into effect, the invention is hereinafter described with reference to the accompanying diagrammatic drawing, which illustrates the application of the invention to bucket-eye under-water bearings of dredgers, and in which:

Figure 1 is an elevation illustrating a general form of bearing according to the invention;

Figures 2 and 3 illustrate detail modifications of sealing ring construction; while Figure 4 relates to an embodiment of the invention in which means are provided for increasing the internal pressure to compensate for rise of exterior pressure.

Referring now to Figure 1 of the drawing, the bucket pin 5 is carried within a suitable bearing, as indicated at 6. This bearing may comprise one or a plurality of bushes, which preferably may be of cast steel. Near each end there are provided grooves, as shown diagrammatically at 7. In the assembled position sealing rings are disposed within the grooves and fit the shaft tightly, the nature of the rings being such that they may be deformed to press tightly into engagement with either the inner wall or the outer wall of the groove 7, according to whether the greater pressure is external or internal. The pin is drilled substantially axially to provide the main oil lead 9, which communicates with any convenient number of substantially radially disposed leads 10. The leads 10 may in their turn communicate with oil grooves such as 11 at the surface of the pin 5. At its outer end the main oil lead 9 has some convenient form of lubricating device, for example a grease gun nipple or grease cup, or may be some ordinary simple form of closure plug. It is intended that the sealing rings 8 shall be readily susceptible of deformation with pressure, and the nature of the surface at the edges of the grooves must be such that when the rings are deformed a liquid-tight joint is provided. The leads 9 and 10 and the groove 11 cooperate for permitting the passage of grease therethrough from an exterior source for distribution throughout the bearing surface.

The pressure deforming the rings 8 may, as above stated, be internal or external. Where internal pressure is relied upon for deforming the rings 8, the bearing is packed with grease, conveniently by means of a grease gun, to a pressure greater than that likely to be encountered and which may be calculated according to the depth of working. In such an arrangement the sealing ring 8 will necessarily bear against the face of the outer edge of the groove 7. By reference to Figure 2 it will be observed that the groove 7 has a flat face 12 outermost, against which bears the outer surface of the sealing ring 8, while at the rear face there are provided inclined openings 13 communicating with the bearing surface and extending up to the back of the ring 8. It will be appreciated that in some cases the openings 13 may be dispensed with, while, alternatively, the inner edge of the groove 7 may slope inwardly all round to admit grease to the back of the sealing ring.

In an arrangement where external pressure deforms the sealing ring 8, the bearing edge 12 of the groove 7 will be behind the sealing ring, and in this arrangement the bearing is only lightly packed with grease.

In the arrangement shown with reference to Figure 3, the sealing ring has the form of a leather washer. As shown, it comprises the two parts 14 and 15, although it will be obvious that it may comprise only a single part. In order that the sealing ring shall be readily renewable, the annular collar 16 is secured by set screws to the end of the bush 6 in the manner illustrated. This adaptation is equally applicable to the construction shown in Figures 1 and 2.

In the embodiment of the invention illustrated with reference to Figure 4 of the drawing, provision is made for varying pressure within the bearing as the exterior pressure varies according to the working depth. The pressure varying means comprises the piston 17 slidable within the housing 18 according to the prevailing pressure transmitted through the diaphragm 19 and liquid 20 contained in the flared part of the housing 18. The head of the piston 17 is suitably packed, as for example by means of the rings 21. The illustration is concerned with the application of pressure-compensating mechanism associated with a bottom tumbler bearing, and although it is found convenient to close one end by means of a cap and use the sealing ring 8 at only one end, it will be appreciated that the sealing rings 8 may in certain circumstances be provided at both ends of the bearing. When the bearing is charged with lubricant for the first time, the pressure lubricating gun is applied to force lubricant through a hole in the cap (not shown). Lubricant displaces the air in the cap and bearing as far as the vent opening 22. The pressure gun is then detached and a plug screwed in to close the cap, whereafter the pressure gun is applied to the opening 22 and more liquid is inserted until the bearing is sufficiently filled. Subsequently the opening 22 is connected by means of a pipe 23 with the outlet 24 of the pressure augmenting means. The chamber 25 of the pressure augmenting device is filled with lubricant through the opening 26 until both the chamber 25 and the pipe-line 23 are full (this should be done before the pipe is connected to the opening 22 of the bearing). Before filling the pressure augmenting means for the first time the piston 17 is depressed to drive air from the chamber 25 through the pipe 23 not yet attached to 22. In filling the chamber 25 the piston 17 is forced up to near its limit position where it abuts the plug 27. The housing 18 on the outer side of the piston is flared, the liquid filling the space 20 conveniently being slightly alkaline water. A groove in the inner face of the bearing 6 leading from the vent opening 22 to the groove 7 permits ready passage of the lubricant from said vent opening to said groove 7 and also permits distribution of a part of said lubricant over the bearing surface.

When the working depth increases, the pressure or head of water on the diaphragm 19 acts through the liquid 20 to depress the piston 17 and so increases the pressure within the bearing. The lower face 28 of the piston is in communication with an air space 29 having a pipe 30 leading up to atmosphere.

It will be apparent that various modifications may be made without departing from the nature of the invention; for example, in all cases sealing rings such as 8 may be provided only at one end of a bearing, the other end being closed by means of a cap or equivalent. Similarly, carrying means, such for example as the guide pins 31, illustrated in Figure 4, may be provided in the grooves 7 to prevent the ring puckering or moving in the groove as the bearing revolves, and in this connection it should also be noted that owing to its fitting the shaft or pin very tightly, the ring 8 may have the tendency to pucker unless the bearing surfaces are slightly wet or greased. It is therefore, advisable that this should be attended to when the bearing is assembled.

In some cases it may be desirable to provide a plurality of sealing rings at one or at both ends of a bearing.

What I claim is:—

A device of the class described including a bearing comprising a bushing having a set of leads terminating in a groove and being adapted to communicate lubricant to the bearing surface, a second set of leads communicating with said first mentioned leads and the groove, a pin journaled in the bushing, a resilient ring adapted to fit about said pin, said ring having a recess, means for forcing fluid through the leads to the bearing, said ring being distortable into fluid tight engagement with the pin and the inner wall of the groove by external fluid pressure, and a guide pin carried by the bushing in the groove and engaged in the recess for preventing puckering of the ring.

CUTHBERT GEORGE WILKINSON.